United States Patent [19]
Romanzi et al.

[11] 3,838,832
[45] Oct. 1, 1974

[54] SAFETY BELT RETRACTOR LOCKING DEVICE

[75] Inventors: Louis Romanzi, Brighton Township; Robert Edward David, Westland, both of Mich.

[73] Assignee: Irvin Industries, Inc., Greenwich, Conn.

[22] Filed: Jan. 2, 1973

[21] Appl. No.: 320,004

[52] U.S. Cl. .......................................... 242/107.4
[51] Int. Cl. ...................... A62b 35/02, B65h 63/04
[58] Field of Search ....... 242/107.4, 107 K, 107 SB, 242/107.2, 107.3, 107.5, 107.6, 107.7; 297/386, 387, 388; 280/150 SB; 188/135

[56] References Cited
UNITED STATES PATENTS
| | | | |
|---|---|---|---|
| 2,650,655 | 9/1953 | Neahr et al. | 242/107.4 |
| 3,430,891 | 3/1969 | Burleigh | 242/107.4 |
| 3,635,420 | 1/1972 | Romanzi | 242/107.4 |

FOREIGN PATENTS OR APPLICATIONS
| | | | |
|---|---|---|---|
| 1,430,422 | 1/1968 | Germany | 242/107 SB |

*Primary Examiner*—John W. Huckert
*Assistant Examiner*—Jon W. Henry
*Attorney, Agent, or Firm*—Ryder, McAuley, Fields, Fisher & Goldstein

[57] ABSTRACT

A vehicle acceleration sensitive locking device is disclosed for use with a conventional safety belt retractor having a shaft mounted ratchet. The locking device includes an inertial mass mounted to sense change in vehicle velocity above a level predetermined to be dangerous. The inertial mass, through a pivotal lever, controls the movement of a pawl by precluding or enabling the pawl to block the rotation of the ratchet and the safety belt retractor shaft and, thereby, prevent protraction of the safety belt.

8 Claims, 11 Drawing Figures

SAFETY BELT RETRACTOR LOCKING DEVICE

BACKGROUND OF THE INVENTION

This invention relates to safety belt retractors and, more particularly, to a device for preventing protraction of a safety belt when the vehicle is undergoing a velocity change.

Most vehicles, especially automobiles, are equipped with safety belts in order to restrain a passenger in his seat when the vehicle is undergoing a substantial change in velocity, such as when the vehicle is involved in an accident. In order for the safety belt to be effective, the belt must be locked into position to prevent protraction of the belt during the vehicle velocity change. For example, if an automobile decelerates rapidly because of an impact, the passenger will be thrown forwardly due to inertia and will apply considerable force against the safety belt. Therefore, in order for the belt to be effective, it must be locked in position to prevent movement of the belt during this deceleration.

Present day retractors permit protraction of the belt while the passenger places the belt around himself, and, upon release of the belt, the retractor draws the belt snugly against the passenger and locks the belt in that position preventing further protraction of the belt. There are times when it is desirable to protract the belt, for example, as when trying to remove something from your pocket such as a handkerchief, or a coin for a toll booth, or even during shifting in the seat for comfort. Most present day retractors do not enable such protraction without unbuckling the safety belt and completely retracting the belt.

OBJECTIVES OF THE INVENTION

Accordingly, it is desirable to have, and it is one objective of this invention to provide, a safety belt retractor locking device which permits protraction of the belt after it is fixed around the body of a passenger without having to unbuckle the belt and yet which prevents protraction of the belt when the change in vehicle velocity exceeds a predetermined amount.

It is another objective of this invention to provide a safety belt retractor locking device which is able to sense change in vehicle velocity in any direction and which may be mounted on conventional retractors.

A further objective of this invention is to provide a safety belt retractor locking device which is inexpensive to manufacture and install and which is highly effective.

BRIEF DESCRIPTION OF THE INVENTION

Briefly described, this invention is intended for use with a safety belt retractor of the type having a rotatably mounted shaft and spool around which a safety belt is wrapped and a spring biasing the spool in a direction to wrap the safety belt around the spool. The retractor also includes a ratchet drivingly connected to the shaft and used to prevent protraction of the safety belt at certain predetermined times. The locking device comprises a pendulous mass which is responsive to a change in vehicle velocity including any change in vehicle direction. The pendulous mass is controlled so that it is movable between a normal position when the change in vehicle velocity is below a predetermined magnitude and retractor locking position when the change in vehicle velocity is greater than a predetermined magnitude.

A pawl having an extensive arm is pivotally mounted so that it is capable of movement between a ratchet non-engaging position permitting protraction of the safety belt to a ratchet engaging position precluding protraction of the safety belt. A spring loaded lever having one arm in contact with the pawl extension and another arm adapted to contact the pendulous mass is pivotally mounted on a bracket attached to the retractor housing. A clutch mechanism is provided which permits the lever to pivot toward the pendulous mass during protraction of the safety belt and causes the level to pivot away from the pendulous mass during retraction of the safety belt.

When the vehicle is stationary or is moving with a velocity change less than a predetermined amount, the pendulous mass is oriented in its normal position. Starting with the safety belt in its fully retracted position, the lever is in a first position wherein it is not in contact with the pendulous mass. The lever prevents the pawl from contacting the ratchet thereby enabling easy protraction of the safety belt. During protraction of the safety belt while the pendulous mass is in its normal position, the lever is caused to contact the mass preventing further movement of the lever. When the lever is in contact with the mass, it still precludes the pawl from preventing rotation of the ratchet and, therefore, protraction of the safety belt still is possible.

When the vehicle undergoes a velocity change greater than a predetermined dangerous amount, the mass pivots to its retractor locking position. During this velocity change, the passenger is pushed against the safety belt tending to protract the belt. Slight protraction of the belt causes the lever to move to a third position where it frees the pawl to contact the ratchet. The pawl, being spring loaded into a ratchet engaging position, moves to that position thereby blocking further movement of the ratchet and, consequently, further rotation of the shaft and protraction of the belt. As soon as the velocity change diminishes to below a predetermined amount, the belt is retracted slightly effecting movement of the lever to its first position thereby permitting protraction of the safety belt as desired.

BRIEF DESCRIPTION OF THE DRAWINGS

The above and other objectives and attendant advantages as well as the structure and operation of the retractor locking device of this invention, will be better understood from the detailed description below taking in combination with the accompanying drawings in which.

DETAILED DESCRIPTION OF THE INVENTION

FIRST EMBODIMENT (FIGS. 1-6)

Figure 6:
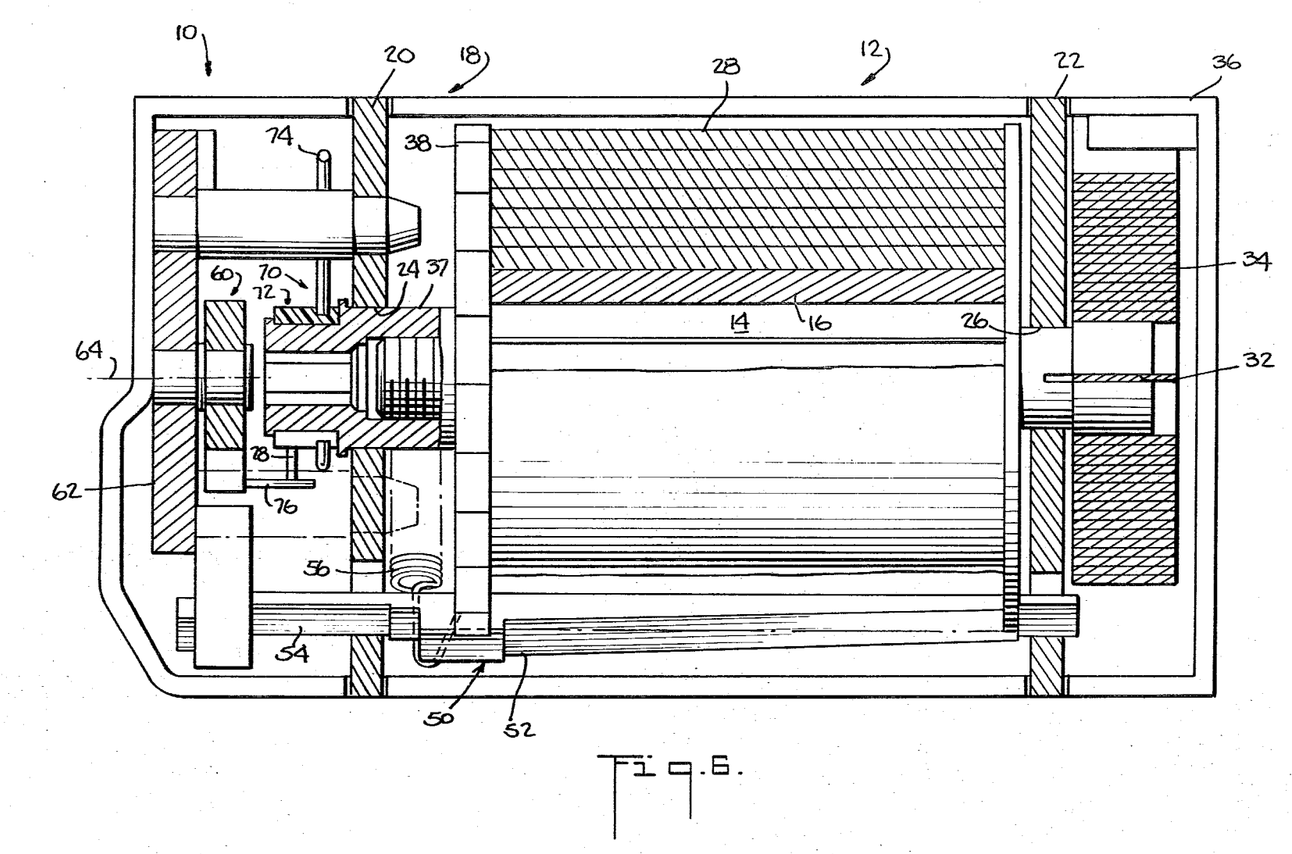
FIG. 6 is a front sectional view taken along the line 6—6 of FIG. 1 with portions deleted for purpose of clarity.

The safety belt retractor locking device 10 of this invention is intended to be used in combination with a conventional safety belt retractor, such as retractor 12 described below and shown in FIGS. 1 and 6.

The retractor 12 illustrated is one type of retractor suitable for use with the locking device 10 but is not intended to be the only retractor usable and, therefore, provides no limitation to the scope of patent coverage claimed herein.

To simplify an understanding of this invention there now follows a description of a typical conventional retractor 12. The retractor includes a shaft 14 on which is mounted a spool 16. The spool 16 is included within a frame 18 formed with spaced apart side walls 20, 22 each having an aperture 24, 26 respectively. The side walls serve as a support for the shaft 14. The spool is provided with a slot (not shown) to fixedly receive one end of a safety belt 28 which is wrapped around the spool 16.

One end 30 of the shaft 14 extends through the aperture 26 in the housing wall 22 and is provided with a slot 32 for receiving the inner end of a helical flat spring 34. The outer end of the spring 34 is attached to or bears against a spring closure 36 which encloses and confines the spring 34. The spring exerts a force on the shaft and, therefore, the spool 16 in the direction of belt retraction.

A hub 37 is mounted on the other end of the shaft 14 and extends through the aperture 24 in side wall 20. A ratchet 38 is mounted on the shaft 14 on the inside of the hub 37 and rotates with the shaft.

A passenger seated in the vehicle seat and desiring to buckle the safety belt about him protracts the safety belt 28 by pulling on one end thereof until it is long enough to enable him to engage that end of the safety belt with a second half of the safety belt (not shown) in a conventional manner. During protraction of the safety belt 28 the flat coil spring 34 is wound tighter thereby applying a greater force on the shaft 14 tending to retract the safety belt 28. Upon release of the safety belt by the passenger, the spring 34 retracts the belt until the belt fits snugly around the passenger. If the passenger wants to extend the belt further, he will be able to do so by merely applying a force on the belt. However, during emergency situations there is nothing provided with the retractor to prevent the belt from being protracted. That is the purpose for the locking device 10.

The locking device 10 comprises a pawl 50 pivotally mounted on the frame 18. The pawl includes a primary portion 52 residing between the walls 20 and 22 of the frame 18 and an extension 54 extending beyond one of the walls 20 of the frame 18. The side walls 20, 22 are provided with openings to pivotally support the pawl 50 enabling the pawl to move between a position where it engages the ratchet 38 preventing the ratchet from rotating in a direction of protraction of the safety belt to a second position where the pawl does not engage the ratchet permitting free rotation of the ratchet. Biasing means, such as a coil spring 56 is connected at one end to the pawl 50 and the other end to the frame 18 placing a biasing force on the pawl toward its ratchet engaging position. The extreme outer end of the pawl extension 54 is provided with an upwardly extending rocker arm 58.

A pawl control lever 60 is pivotally mounted on a bracket 62 which in turn is attached to the side wall 20. The lever 60 is provided with an arm 63 extending from the lever axis 64 away from the pawl 50 and a second arm 66 on the same side of the lever axis 64 as the pawl 50. The axis about which the pawl 50 pivots is substantially parallel to the lever axis 64. Resilient means, such as a coil spring 68, biases the lever to pivot in a direction where the arm 66 moves away from the pawl 50 or, in other words, clockwise as shown in FIG. 1.

Movement of the pawl control lever 60 is controlled in part by a clutch 70. The clutch comprises a split ring 72 mounted on the shaft hub 37 and held in frictional engagement therewith by a spring 74. Ring 72 is formed having a lug 78 extending from one side thereof and a projection 79 defining a camming surface 80 extending from a substantially opposite side of Ring 72. A lug 76 attached to the pawl control lever 60 extends toward the clutch 70 where it is engageable with the lug 78 projecting from the split ring 72. A bracket 92, hereinafter referred to in connection with the central control for the retractor locking device 10, is attached to bracket 62 and extends toward the clutch 70 where it is engageable with the projection 79 of split ring 72. The arrangement is such that the degree of rotation of the split ring 72 is limited in one direction by the pawl control lever 60 and is limited in the other direction by the bracket 62. More specifically, when the safety belt 28 is protracted and the shaft 14 and hub 37 rotate (clockwise in FIG. 1) the split ring 72 rotates until the camming surface 80 contacts the upper surface of bracket 92 preventing further clockwise rotation of the split ring 72. The hub 37 continues rotating during protraction of the safety belt 28 providing a sliding interface movement with the split ring 72.

Figure 1:
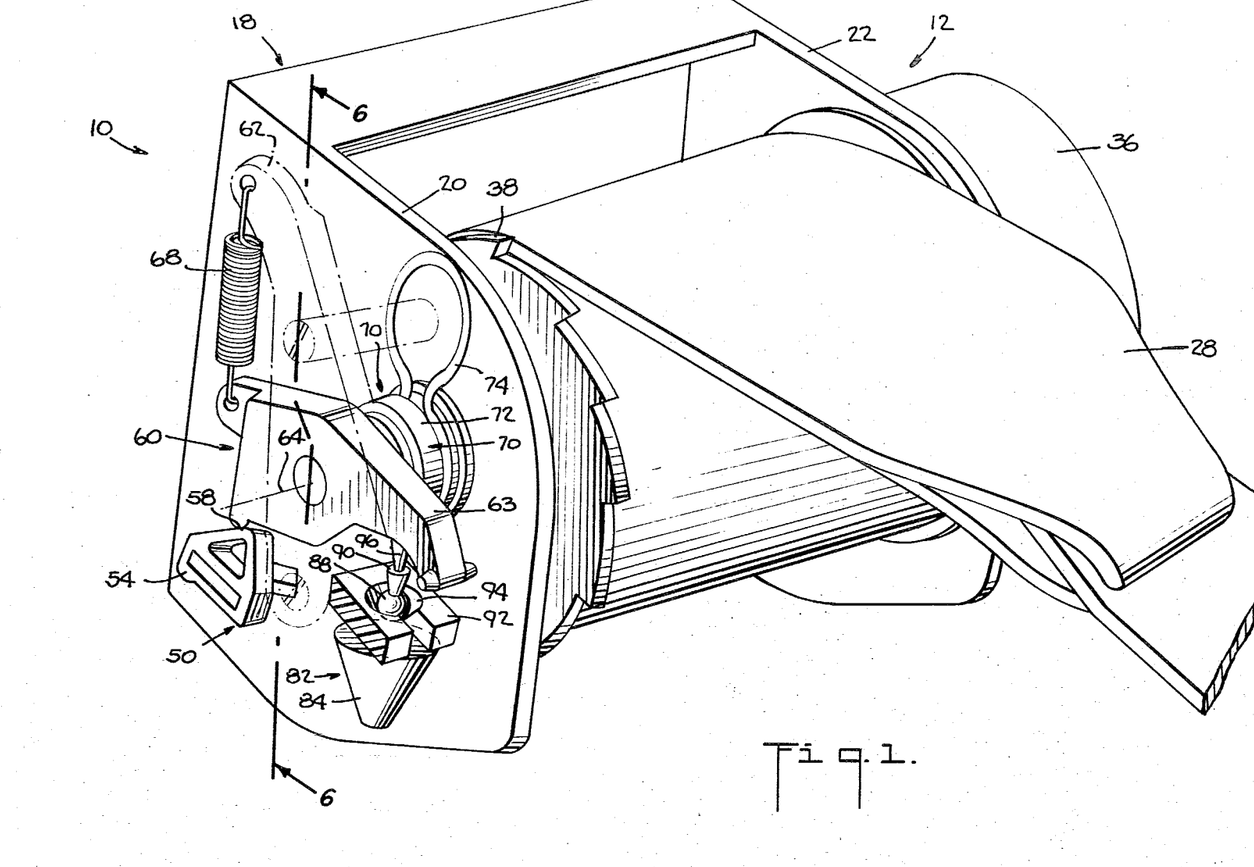
FIG. 1 is a perspective view of the safety belt retractor locking device formed in accordance with a first embodiment of this invention, the locking device cover having been removed to illustrate operative parts thereof.
Figure 2:
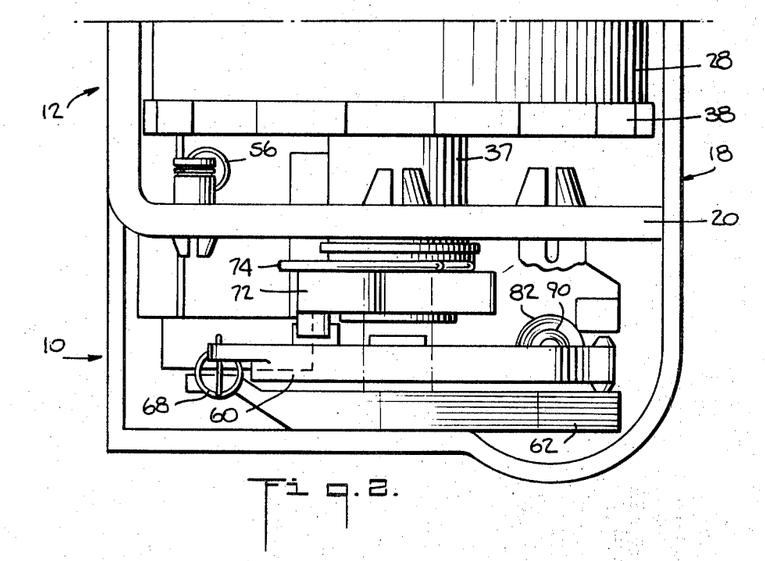
FIG. 2 is a top view of the locking device of FIG. 1.

On retraction of the safety belt 28, the split ring 72 rotates with the hub 37 (counter-clockwise in FIG. 1). The split ring lug 78 abuts the pawl control lever lug 76 and forces the pawl control lever 60 to rotate with the split ring 72. The pawl control lever 60 in turn abuts the pawl rocker arm 58 forcing the pawl 50 to pivot downwardly. When the pawl 50 reaches the end of its permitted pivotal motion, the pawl causes the pawl control lever 60 to stop rotating which in turn limits the extent of rotation of the split ring 72.

The central control for the entire retractor locking device 10 is a member which is responsive to change in vehicle velocity. As is best illustrated in FIGS. 1, 3-5, a pendulous mass 82 having a weighted conical bottom 84, a stem 86, a spherical mounting section 88 and a conical crown or head 90 is supported by the bracket 92 having a conical depression 94 to receive the spherical mount 88. The pendulous mass 82 is free to pivot 360° about a vertical axis drawn centrally through the conical depression 94. Since the safety belt retractor is mounted on a vehicle such that when the vehicle is in its normal horizontal position the pendulous mass 82 hangs vertically downwardly it can be seen that the pendulous mass 82 will sense a change in vehicluar velocity including direction in any conceivable direction that the change might occur.

The pendulous mass 82 controls the position of the pawl control lever 60. A contact 96, such as a pin, suspends from the pawl control lever 60 and is aligned with an axis drawn vertically through the center of the depression 94 in the bracket 92. Consequently, when the pendulous mass 82 is in a normal vertical alignment that pin 96 is aligned with the center of the pendulous mass head 90 which limits the angle through which the control lever 60 can pivot. When the pendulous mass swings through at least a predetermined angle in the order of 10°-20°, the mass head 90 no longer is aligned with the pin 96 and the control lever 60 can pivot through a greater angle resulting in preventing protraction of the safety belt as is described below.

If desired, a coil spring 98 may be placed between the underside of the bracket 92 and the upper surface of the conical mass 84 in order to place some restraint upon the movement of the pendulous mass 82. The resiliency of the coil spring 98 is selected so that the pendulous mass 82 pivots no more than a predetermined number of degrees (for example, 10°-20°) when the change in vehicle velocity is less than a predetermined magnitude, which predetermined magnitude is determined to be sufficiently small as not to place passengers in the vehicle in danger of injury so that it is not necessary for the safety belt to be precluded from protraction. A change in vehicle velocity greater than the predetermined amount, however, causes the pendulous mass 82 to pivot more than the minimum angle and, thereby, results in locking the safety belt.

Operation of the First Embodiment

Figure 3:
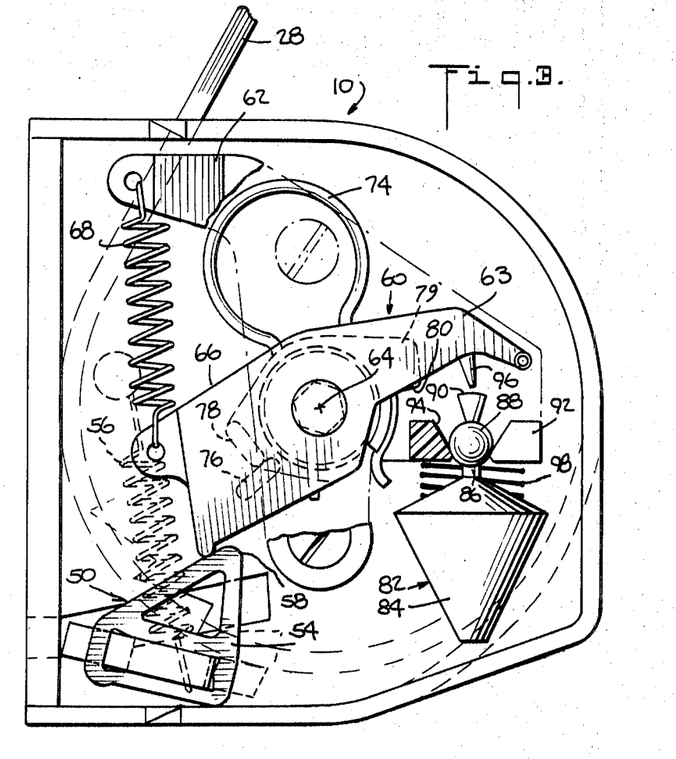
FIG. 3 is an end view of the locking device of FIG. 1 shown when the vehicle in which the locking device is installed is horizontally aligned and is not undergoing a rapid velocity change.
Figure 4:
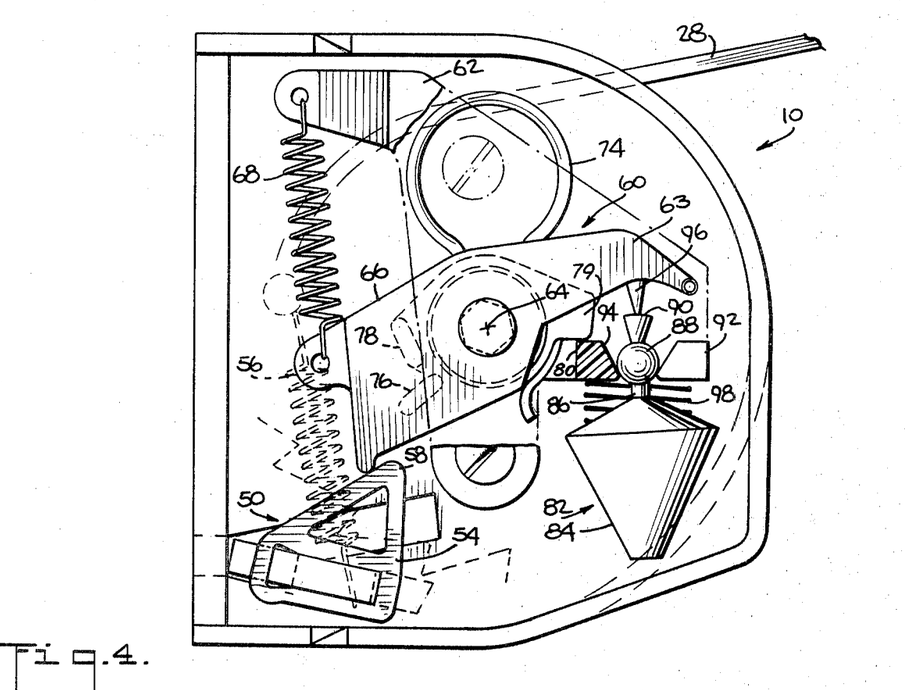
FIG. 4 is an end view of the locking device of FIG. 1 during protraction of the safety belt when the change in vehicle velocity is less than a predetermined dangerous amount.
Figure 5:
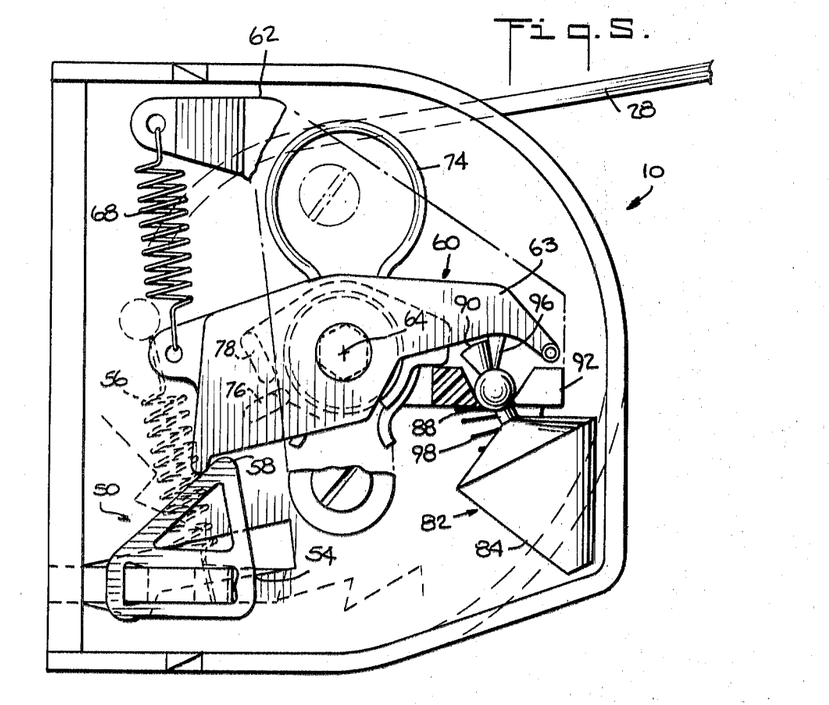
FIG. 5 is an end view of the locking device of FIG. 1 when the vehicle is undergoing a velocity change in excess of a predetermined dangerous amount and a protraction force is applied to the safety belt.

The operation of the locking device 10 can best be understood by comparison of FIGS. 3, 4 and 5. FIG. 3 illustrates the positions of the various elements of the locking device 10 when the safety belt 28 is in a fully retracted position and also when the safety belt has been protracted for use around a passanger and has been retracted slightly to fit the passenger snugly. Furthermore, FIG. 3 shows the elements when the vehicle is horizontal and either stationary or moving with no change in vehicle velocity (speed or direction).

The pendulous mass 82 hangs vertically downwardly from its supporting bracket 92. During the previous retraction of the safety belt, the split ring 72 and lug 78 have forced the pawl control lever 60 into its extreme counter-clockwise position and the pawl control lever 60 has forced the pawl 50 into position where it does not interfere with movement of the ratchet 38. The coil spring 56 tends to pull the pawl 50 toward the ratchet; however, the pawl is restrained from such movement by the pawl control lever 60. The coil spring 68 tends to pull the pawl control lever 60 away from the pawl 50; however, the lever 60 is prevented from rotation by the lug 78 on the split ring 72. As can be seen, there is a slight clearance between the bottom of the pin 96 and the top of the pendulous mass head 90 in order that movement of the pendulous mass 82 is not interfered with by the control lever 60.

FIG. 4 represents the position of the elements of the locking device 10 during protraction of the safety belt when the change in vehicle velocity is less than the predetermined dangerous amount. As the safety belt 28 is protracted rotation of the shaft 14 and hub 37 causes rotation (clockwise as illustrated) of the split ring 72 which in turn removes the split ring lug 78 from contact with the pawl control lever lug 76. The coil spring 68 causes the pawl control lever 60 to pivot slightly in a clockwise direction until such time as the pin 96 contacts the top of the pendulous mass head 90. Since the clearance between the pin 96 and head 90 before rotation of the lever 60 was very slight, the angle of rotation of the lever 60 during protraction of the safety belt is quite small, for example, approximately 1°. Movement of the arm 66 of the lever 60 upwardly permits the coil spring 56 to pivot the pawl 50 toward the ratchet 38 slightly but not an amount sufficient to permit the pawl to interfere with rotation of the ratchet.

FIG. 5 illustrates the position of the elements of the locking device 10 at such time when the vehicle velocity has changed by an amount greater than the predetermined dangerous amount and the passenger has applied a force against the safety belt 28 sufficient to tend to protract the safety belt. For example, if the vehicle is involved in a collision while moving forwardly, the vehicle will decelerate and the passenger will tend to move forwardly, thereby applying a protraction force on the safety belt.

Immediately prior to the collision the locking device elements are in a position illustrated in FIG. 3. At the moment of collision, the pendulous mass 82 is caused to pivot by the movement of the weighted bottom 84 caused by inertia which is large enough to overcome the restraining force of the spring 98 (if such a spring is used). The degree of movement of the pendulous mass 82 is sufficient to move the head 90 out of alignment with the pawl control lever pin 96. The passenger, whose body is thrust against the safety belt 28, causes slight protraction of the safety belt which causes the shaft 14 and hub 37 to rotate, thereby freeing the pawl control lever 60. The coil spring 68 causes the pawl control lever 60 to pivot (clockwise) in turn freeing the pawl 50 which then is moved by the coil spring 56 an amount sufficient to have the pawl engage the ratchet 38 preventing rotation of the ratchet. Since the ratchet is fixedly attached to the shaft 14, the pawl effectively prevents the shaft 14 from continued rotation and, therefore, prevents further protraction of the safety belt. When the passenger no longer applies a protraction force on the safety belt 28, the spring 34 retracts the safety belt until it is snug against the passenger and resets the elements to their normal position as shown in FIG. 3.

Second Embodiment (FIGS. 4 – 11)

The second embodiment 100 employs the same concept used in the first embodiment discussed above, but a different operating mechanism is utilized.

A safety belt retractor 102 having the same construction as described above and illustrated in FIG. 6 may be used. In such a retractor, a safety belt 104 is wound around a spool mounted on a shaft 106 which is supported by spaced-apart walls 107, 108 of a frame 109. A shaft control ratchet 110 is mounted on the shaft 106 for rotation therewith. A flat helical spring (not shown) is enclosed within a spring enclosure 112 mounted on the outside of the retractor frame 109. The spring is attached to the shaft 106 for the purpose of providing a retraction force on the shaft.

A clutch in the shape of a cam 114 (best seen in FIG. 11) is mounted on the shaft 106 in a manner as to permit relative rotation between the shaft and the cam 114. The cam is generally circular and includes two spaced-apart lobes 115, 116 which define a recess 117 therebetween. The cam 114 is of the same general diameter as the ratchet 110; however, the lobes 115, 116 project beyond the maximum diameter of the ratchet 110. A coil spring 118 forces the cam 114 against the ratchet 110 so that when no restraining force is applied to the cam 114, it will be rotated by the ratchet 110 which, in turn, is rotated by the spool shaft 106. The cam 114 also includes a projection 119 which is received by an arcuate slot 120 formed in the frame wall 107. The slot 120 limits the extent of rotation of the cam 114. When the cam reaches the limit of its movement, the shaft and cam have a sliding interface.

Figure 7:
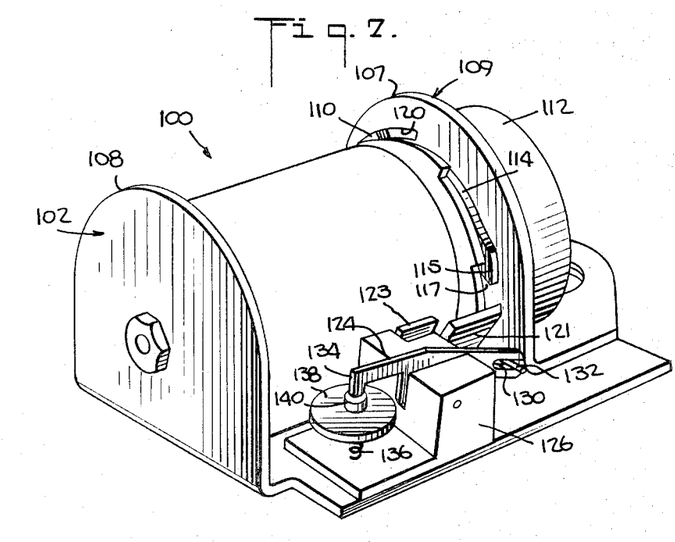
FIG. 7 is a perspective view of a safety belt retractor locking device formed in accordance with a second embodiment of this invention and shown when the safety belt is fully retracted and the velocity of the vehicle in which the locking device is mounted is not changing rapidly.
Figure 8:
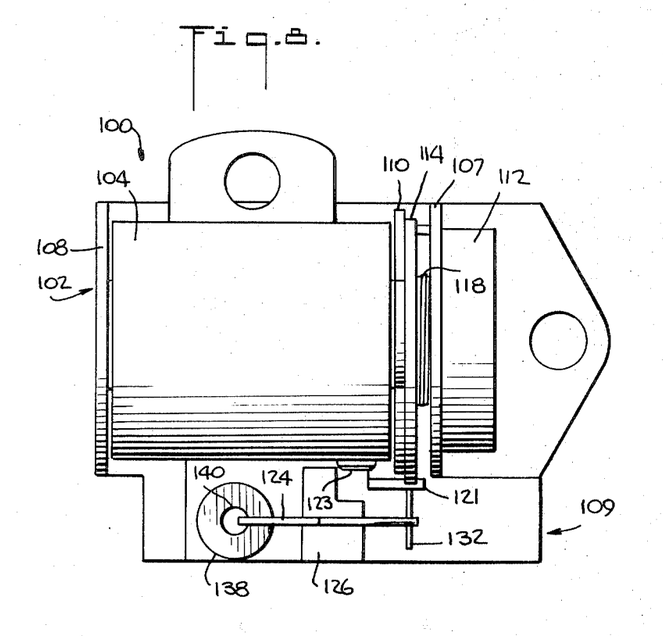
FIG. 8 is a top view of the locking device of FIG. 7.

A pawl 121 is pivotally supported on the retractor frame 109 for movement between a first position where it does not interfere with rotation of the ratchet 110 to a second position where it prevents rotation of the ratchet 110. The pawl 121 is biased toward the ratchet engaging position by a coil spring 122 attached to the base of the frame 109. Formed as part of, or attached to, the surface of the pawl facing the safety belt 104 is a reset lever 123 which is operated by the safety belt 104 being wound upon the spool. More specifically, when the safety belt 104 is fully retracted, the diameter of the belt about the spool is sufficient to force the reset lever 123 away from the ratchet 110 resulting in forcing the pawl 121 into its ratchet nonengaging position.

A pawl control lever 124 is pivotally mounted on a bracket 126 which, in turn, is mounted on the retractor frame 109. One end of the lever 124 is provided with a slot 130 for slidingly receiving a pin 132 extending from the pawl 121. The other end of the lever 124 is formed with a depending projection or pin 134 which serves as a contact point. Extending upwardly from the bracket 126 in alignment with the depending projection 134 is a resilient support means, such as a coil spring 136. An inertial mass 138 is mounted on the top of the spring 136 and is formed with a crown or head 140 normally in alignment with the depending projection 134 of the lever 124. The resiliency of the coil spring 136 permits the inertial mass 138 to move in any direction about a vertical axis through the spring. Such movement will be caused by a rapid change in velocity of the vehicle on which the safety belt retractor is mounted.

Operation of the Second Embodiment

Figure 9:
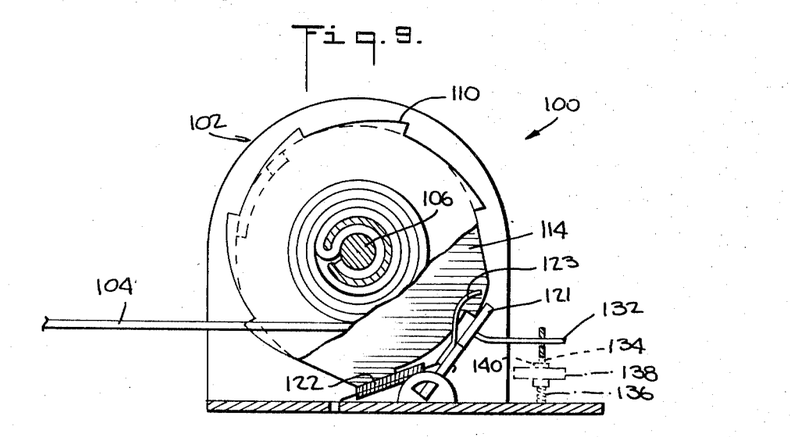
FIG. 9 is an end view of the locking device of FIG. 7 shown during protraction of the safety belt when the change in vehicle velocity is less than a predetermined dangerous amount.
Figure 10:
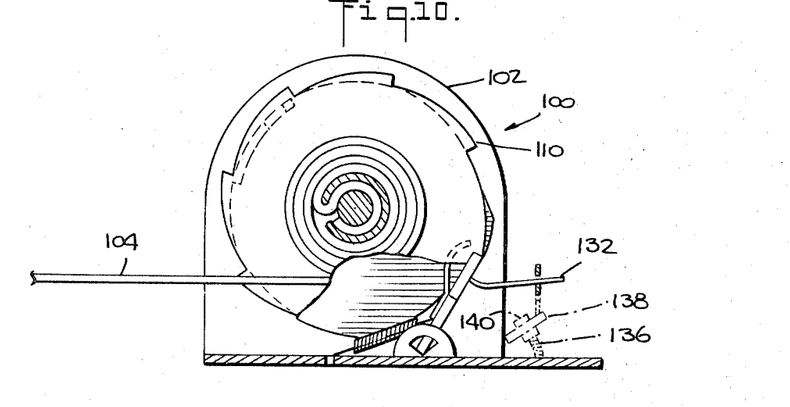
FIG. 10 is an end view of the locking device of FIG. 7 shown when the vehicle is undergoing a velocity change in excess of a predetermined dangerous amount and a protraction force is applied to the safety belt.
Figure 11:
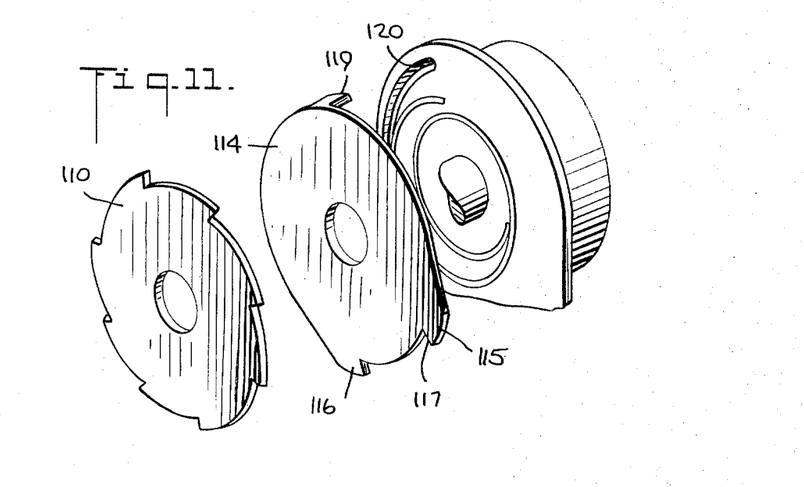
FIG. 11 is a perspective view of a ratchet, cam and housing wall of the locking device of FIG. 7.

The operation of the locking device 100 can best be understood by reference to FIGS. 7, 9 and 10. FIG. 7 illustrates the positions of various elements of the locking device 100 when the safety belt is in its fully retracted position and when the vehicle is horizontal and stationary or moving with no change in velcoity (speed or direction).

The safety belt 104 presses upon the reset lever 123 which forces the pawl 121 to pivot away from the ratchet 110 and cam 114. The pawl moves the pin 132 downwardly forcing the pawl control lever 124 to pivot so as to raise the depending projection 134 away from the inertial mass 138 (in a clockwise direction as shown in FIG. 7). The cam 114 is at one extreme end of its rotational limit wherein the recess 117 is not aligned with the pawl 121.

Turning now to FIG. 9, when the passenger sits in the vehicle and protracts the safety belt 104, the ratchet 110 and cam 114 rotate causing the recess 117 to pass beyond the pawl 121 and the lobe 115 to be aligned with the pawl at which time the cam 114 is prevented from rotating further by the end of the arcuate slot 120. Until the lobe 115 is aligned with the pawl the diameter of the spool with the safety belt wrapped around it is large enough to keep the pawl from entering the recess 117 as the cam 114 rotates. However, after the safety belt is protracted a short distance the safety belt and spool diameter is reduced sufficiently so that the reset lever 123 is not longer forced outwardly and the coil spring 122 tends to pull the pawl 121 toward the ratchet 110. As the pawl moves toward the ratchet, the pin 132 rises causing the depending projection 134 of the control lever 124 to move downwardly until it contacts the crown 140 of the inertial mass 138 preventing the control lever from moving further. Furthermore, the pawl hits the lobe 115 of the cam 114 and is prevented from moving into interfering position with the ratchet 110. Therefore, when the projection 134 and crown 140 are in contact, the pawl 121 is prevented from pivoting into ratchet engaging position by the lever 124 as well as by the cam 114 (see FIG. 9).

In this position the ratchet is free to turn in either direction, thereby permitting continued protraction and retraction of the safety belt 104. This enables the passenger to continually readjust the safety belt 104. Because the cam 114 prevents the pawl from contacting the ratchet 110, the belt can be protracted even if the vehicle is oriented at a sufficient angle to cause the crown 140 to become misaligned with the depending projection 134 due to gravitational pull on the crown 140. Therefore, the initial orientation of the vehicle, for example the parking position of an automobile, will not preclude protraction of the safety belt.

After the belt is buckled about the passenger, the retractor retracts the belt until the belt is snug against the passenger. During this small degree of retraction, the cam 114 rotates sufficiently to either bring the recess 117 into alignment with the pawl 121 or just beyond alignment. As long as the depending projection 134 and crown 140 are in contact, the pawl will not move to its ratchet engaging position thereby permitting continued protraction of the safety belt if desired.

When the velocity change of the vehicle exceeds a predetermined dangerous amount, the inertial mass 138 will move sufficiently causing misalignment of the crown 140 and depending projection 134 (see FIG. 10). The subsequent protraction force caused by the passenger being thrust against the safety belt causes the ratchet 110 and cam 114 to begin to rotate. When the recess 117 is in alignment with the pawl 121, the coil spring 122 pulls the pawl toward its ratchet engaging position. The pawl is not prevented from moving into that position since the pawl control lever 124 may now pivot freely without being restrained in its movement by the crown 140. The pawl then engages the ratchet 110 preventing further rotation of the ratchet and shaft 106 and, consequently, preventing further protraction of the safety belt 104.

Upon completion of the rapid velocity change, such as when the vehicle is brought to a sudden stop and the passenger relaxes in his seat, the safety belt is retracted to snugly fit the passenger. During this retraction the cam 114 rotates counterclockwise (FIG. 10) sufficiently to cause the lobe 116 to force the pawl 121 away from the ratchet 110 and to force the pin 132 downwardly. The pin 132 pivots the control lever 124 away from the inertial mass 138 allowing the spring 136 to return the mass to its normal position. The locking device 100 now is reset.

SUMMARY

From the above it can be seen that the safety belt retractor locking device of this invention provides the convenience of permitting continual protraction and retraction during the entire period when the vehicle is not undergoing a velocity change in excess of a predetermined dangerous amount and effectively prevents protraction during dangerous velocity changes. This convenience is provided with a device which can be manufactured and installed inexpensively and which is adapted to be used with conventional retractor mechanisms.

What is claimed is:

1. A safety belt retractor locking device comprising:

a. a frame;
 b. a shaft rotatably mounted on the frame;
 c. a belt attached the shaft for protraction and retraction with respect thereto;
 d. means for rotating the shaft to retract the belt;
 e. a ratchet wheel mounted on the shaft for rotation therewith;
 f. a pawl pivotally mounted on the frame for movement from an inoperable position wherein said pawl is spaced from the ratchet to an operate position wherein said pawl engages the ratchet to prevent protraction of the belt;
 g. means for moving the pawl to its operate position;
 h. an inertial mass mounted on the frame and responsive to a change in vehicle velocity, said mass having a contact element disposed for movement between a first position wherein the velocity change is below a predetermined magnitude and a second position wherein the velocity change is greater than said predetermined magnitude.
 i. a lever pivotally mounted on the frame and responsive to protraction and retraction of the belt, said lever having a contact element disposed for movement between:
  1. a first position wherein said lever contact is spaced from the mass contact upon retraction of the belt;
  2. a second position wherein said lever contact engages the mass contact upon protraction of the belt when the mass is in its first position; and
  3. a third position wherein said lever contact is in noncontacting relation with the mass contact upon protraction of the belt when the mass is in its second position;
 j. means for moving the lever to its second and third positions;
 k. said lever contact being in alignment with the mass contact to prevent movement of the lever to its third position when the mass is in its first position, and said lever contact being out-of-alignment with the mass contact to permit movement of the lever to its third position when said mass is in its second position;
 l. said lever and said pawl being in driving engagement with each other such that when the lever is in its first and second positions the pawl is in its inoperable position, and when the lever is in its third position the pawl is in its operate position to prevent further protraction of the belt; and
 m. clutch means mounted on the shaft for partial rotation therewith, said clutch means being operatively connected to the pawl and lever to displace said lever to its first position and said pawl to its inoperable position upon retraction of the belt.

2. The safety belt retractor locking device as recited in claim 1, wherein the third position of said lever locates the lever contact a predetermined distance from the location of said contact when the lever is in its second position.

3. The safety belt retractor locking device as recited in claim 2, wherein said mass contact comprises a crown portion of the mass; said pivotally mounted lever having an arm extending toward the mass; and said lever contact comprising a pin depending from the arm and projecting toward the crown.

4. The safety belt retractor locking device as recited in claim 1, wherein said clutch means comprises a slip ring rotatably mounted on the shaft and having a lug projecting therefrom; said lever having a lug projecting toward said ring; said lugs disposed to interengage upon retraction of the belt to displace the lever to its first position and the pawl to its inoperable position.

5. The safety belt retractor locking device as recited in claim 1, wherein said clutch means comprises a cam rotatably mounted on the shaft and having a camming edge disposed to interengage with the pawl upon retraction of the belt to displace said pawl to its inoperable position and the lever to its first position.

6. The safety belt retractor locking device as recited in claim 5, wherein said cam further includes a second camming edge and a recess portion located between said edges; said second camming edge disposed to interengage with the pawl upon initial protraction of the belt to displace said pawl to its inoperable position and the lever to its second position; and said recess portion disposed to receive said pawl upon subsequent protraction of the belt when the mass is in its second position to permit movement of said pawl to its operate position and the lever to its third position to prevent further protraction of the belt.

7. The safety belt retractor locking device as recited in claim 1, further comprising means for pivotally mounting the mass on the frame; and bias means urging the mass toward its first position.

8. The safety belt retractor locking device as recited in claim 7, wherein the center of gravity of the mass is located below the mounting means.

* * * * *

UNITED STATES PATENT OFFICE
CERTIFICATE OF CORRECTION

Patent No. 3,838,832     Dated   October 1, 1974

Inventor(s) Louis Romanzi and Robert Edward David

It is certified that error appears in the above-identified patent and that said Letters Patent are hereby corrected as shown below:

Col. 10, line 34, Claim 3, "in claim 2" should read --in claim 1--.

Signed and sealed this 15th day of April 1975.

(SEAL)
Attest:

RUTH C. MASON
Attesting Officer

C. MARSHALL DANN
Commissioner of Patents
and Trademarks